US008959822B2

(12) United States Patent
Kleppe

(10) Patent No.: US 8,959,822 B2
(45) Date of Patent: Feb. 24, 2015

(54) METHODS AND APPARATUS TO SUPPORT AND STABILIZE EQUIPMENT

(76) Inventor: Shirley Kleppe, Scottsdale, AZ (US)

( * ) Notice: Subject to any disclaimer, the term of this patent is extended or adjusted under 35 U.S.C. 154(b) by 901 days.

(21) Appl. No.: 12/844,130

(22) Filed: Jul. 27, 2010

(65) Prior Publication Data

US 2010/0287810 A1  Nov. 18, 2010

Related U.S. Application Data

(63) Continuation-in-part of application No. 12/495,950, filed on Jul. 1, 2009, now abandoned.

(60) Provisional application No. 61/077,422, filed on Jul. 1, 2008.

(51) Int. Cl.
| | |
|---|---|
| *F41C 27/00* | (2006.01) |
| *F41C 23/16* | (2006.01) |
| *F16M 13/02* | (2006.01) |
| *F16M 11/28* | (2006.01) |
| *F41A 23/16* | (2006.01) |
| *F41C 27/22* | (2006.01) |
| *F16M 11/26* | (2006.01) |
| *F16M 11/32* | (2006.01) |
| *F16M 13/00* | (2006.01) |
| *G03B 17/56* | (2006.01) |

(52) U.S. Cl.
CPC .............. *F16M 11/28* (2013.01); *F41C 23/16* (2013.01); *F41A 23/16* (2013.01); *F41C 27/22* (2013.01); *F16M 11/26* (2013.01); *F16M 11/32* (2013.01); *F16M 13/00* (2013.01); *G03B 17/561* (2013.01)
USPC ....................... 42/94; 248/346.03; 248/346.2

(58) Field of Classification Search
CPC .......... F41A 23/16; F41C 23/16; F41C 27/22; F16M 13/02; F16M 13/022
USPC ............ 248/346.06, 346.2, 104, 910, 346.03, 248/118, 176.1; 396/422, 55, FOR. 913; 42/94, 95, 97; 89/37.04, 37.13; D22/108, 111, 199
See application file for complete search history.

(56) References Cited

U.S. PATENT DOCUMENTS

| | | | |
|---|---|---|---|
| 2,569,435 A | | 9/1951 | Martin |
| 4,130,263 A | * | 12/1978 | Roericht ...................... 248/371 |
| 4,162,696 A | * | 7/1979 | Sprung ...................... 206/316.2 |
| 4,409,751 A | | 10/1983 | Goda et al. |
| 4,606,524 A | * | 8/1986 | Conee ........................ 248/346.06 |
| 4,771,299 A | * | 9/1988 | Gell, Jr. ......................... 396/26 |
| D310,677 S | * | 9/1990 | Stidham et al. .............. D16/242 |
| 4,982,841 A | * | 1/1991 | Goedecke ................... 206/316.2 |
| 5,222,708 A | * | 6/1993 | McLellan ................... 248/345.1 |
| 5,350,147 A | * | 9/1994 | Paganus ...................... 248/346.2 |
| 5,421,115 A | | 6/1995 | McKay |
| 5,810,313 A | * | 9/1998 | Armstrong ................. 248/346.2 |
| 5,815,974 A | | 10/1998 | Keng |
| 6,073,902 A | | 6/2000 | Hiles |
| 6,330,992 B1 | * | 12/2001 | Swayhoover et al. ...... 248/230.8 |

(Continued)

*Primary Examiner* — Tan Le
(74) *Attorney, Agent, or Firm* — The Noblitt Group, PLLC

(57) ABSTRACT

Methods and apparatus to support and stabilize equipment according to various aspects of the present invention include a conformable support surface mounted to a rigid base. The rigid base may comprise a connector suitably configured to attach the rigid base to a secondary supportive device or stand. The conformable support surface may be configured to receive and support a piece of equipment such as a rifle or camera without a permanent or semi-permanent connection between the cushioned support surface and the equipment.

7 Claims, 7 Drawing Sheets

(56) References Cited

U.S. PATENT DOCUMENTS

| | | |
|---|---|---|
| 6,349,180 B1 * | 2/2002 | Jabbour et al. ............... 396/535 |
| 6,425,697 B1 | 7/2002 | Potts et al. |
| 6,439,530 B1 * | 8/2002 | Schoenfish et al. ...... 248/346.06 |
| 6,445,408 B1 * | 9/2002 | Watkins ....................... 348/148 |
| 6,997,511 B2 * | 2/2006 | Marchand et al. ............ 297/314 |
| 7,571,563 B2 | 8/2009 | Peterson |
| 2008/0013194 A1 | 1/2008 | Dowell |
| 2008/0063391 A1 * | 3/2008 | Segawa et al. ............... 396/422 |
| 2010/0287810 A1 * | 11/2010 | Kleppe ........................... 42/94 |

\* cited by examiner

METHODS AND APPARATUS TO SUPPORT AND STABILIZE EQUIPMENT

CROSS-REFERENCE TO RELATED APPLICATIONS

This application is a continuation-in-part of U.S. patent application Ser. No. 12/495,950, filed on Jul. 1, 2009, now abandoned which claims the benefit of U.S. Provisional Patent Application No. 61/077,422, filed on Jul. 1, 2008, and incorporates the disclosure of each application by reference.

BACKGROUND OF INVENTION

Hand-held equipment such as rifles and cameras often utilize supportive and/or stabilizing devices to assist with aiming the equipment at a target. Many supportive and/or stabilizing devices are directed at providing a stable base between the equipment and another object such as the ground or a platform. These devices may also attempt to reduce the impact vibrations, jitters, and/or similar unsteady movements induced by the user when a target is being sighted. Various methods and devices to stabilize equipment have been developed including tripods, monopods, and other similar support systems that not only provide a stable base but also allow for some degree of hands free operation. Many of these methods and/or devices require at least one of time, space, and suitable location to be used properly. A tripod, for example, takes time to set up which may result in a lost opportunity to effectively aim and shoot at a target. A tripod also takes time to break down which can delay moving to a new location.

Some devices require physical attachment to the equipment further adding to the time it takes to set up for a shot and adding to the time necessary to break down after a shot. Other devices may be configured for semi-permanent attachment to the equipment. For example, a set of legs may be attached to the barrel portion of a rifle to assist with target sighting by helping to stabilize the rifle when a user is aiming. The legs can be folded or collapsed along the length of the rifle when the user is not sighting a target. The use of such devices, however, often results in the loss of mobility, a decrease in response time, and/or added weight, thereby making the equipment more cumbersome than may be desirable for some enthusiasts.

SUMMARY OF THE INVENTION

Methods and apparatus to support and stabilize equipment according to various aspects of the present invention include a conformable support surface mounted to a rigid base. The rigid base may comprise a connector suitably configured to attach the rigid base to a secondary supportive device or stand. The conformable support surface may be configured to receive and support a piece of equipment such as a rifle or camera without a permanent or semi-permanent connection between the cushioned support surface and the equipment.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described herein in terms of functional block components and various processing steps. Such functional blocks may be realized by any number of hardware components configured to perform the specified functions and achieve the various results. For example, the present invention may employ various process steps, apparatus, systems, etc. Further, the present invention may employ any number of conventional techniques for targeting objects, stabilizing items, and the like.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system.

Figure 1:
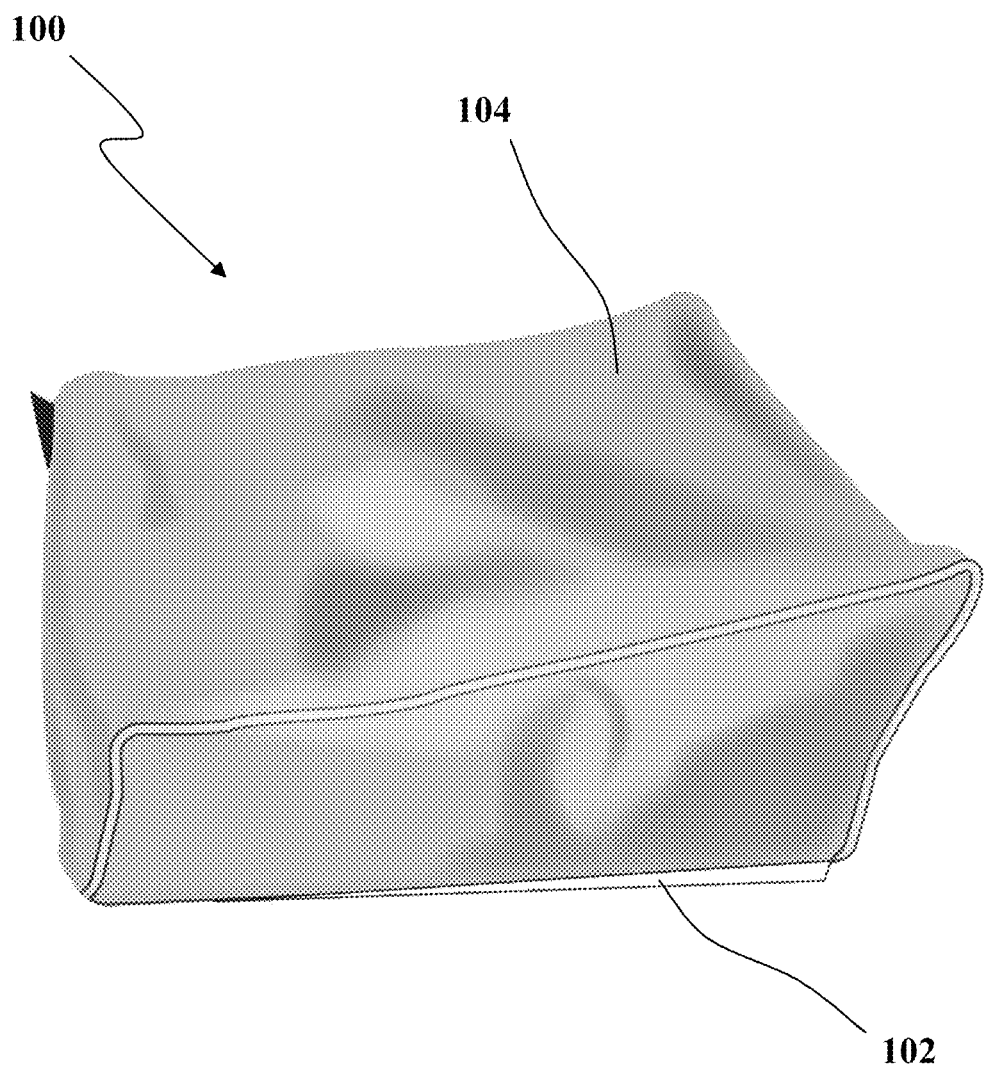
FIG. 1 representatively illustrates a support device in accordance with an exemplary embodiment of the present invention.

Methods and apparatus to support and stabilize equipment according to various aspects of the present invention may operate in conjunction with any suitable mobile and/or stationary mounting device or stand. Various representative implementations of the present invention may be applied to any system for sighting, targeting, or locating objects. Certain representative implementations may include, for example, supporting rifles, cross-bows, cameras, telescopic devices, and the like. Referring now to FIG. 1, methods and apparatus to support and stabilize equipment according to various aspects of the present invention may operate in conjunction with a support device 100 comprising a rigid base 102 connected to a conformable support member 104. The rigid base 102 may be attached to the conformable support member 104 to allow an object, such as a portion of a rifle, to be temporarily placed or rested on the conformable support member 104 without requiring mechanical attachment between the object and the conformable support member 104.

The rigid base 102 may comprise a surface capable of attachment to a separate mounting device and be suitably configured to support the weight of the object without significant deformation. The rigid base 102 may comprise any system suitably configured to support an object, such as a plate, a board, a block, or a platform. The rigid base 102 may comprise any suitable material such as wood, metal, plastic, or composite material. The rigid base 102 may also comprise multiple elements coupled together. For example, in one embodiment, the rigid base 102 may comprise at least two plates either bonded or mechanically coupled together. The rigid base 102 may also comprise stiffeners suitably adapted to reinforce the rigid base 102 against deformation when subjected to weight loading. For example, the rigid base 102 may comprise a thin metallic plate with carbon fiber reinforced doublers located on a surface of the rigid base 102 and suitably adapted to increase the resistance of the rigid base 102 to bending or other deformation.

The rigid base 102 may also be configured in any shape, size, or thickness. For example, in one embodiment, the rigid base 102 may comprise a rectangular piece of machined aluminum approximately six inches wide, twelve inches long, and approximately one-eighth of an inch thick. In another embodiment, the rigid base 102 may comprise a curve shaped carbon reinforced composite material of between approximately one-sixteenth of an inch thick and two inches thick. The rigid base 102 may also be configured with extendable elements and/or attachable elements suitably adapted to modify the overall dimensions of the rigid base 102 to extend use of the support device 100 with large or oversized objects.

Figure 2:
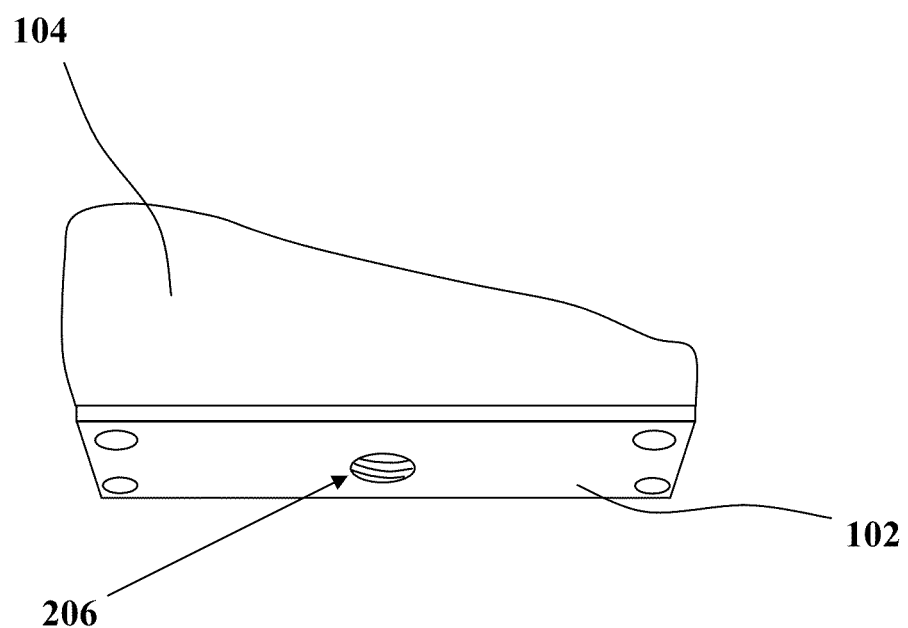
FIG. 2 representatively illustrates a three-quarter view of a support device in accordance with an exemplary embodiment of the present invention.
Figure 3:
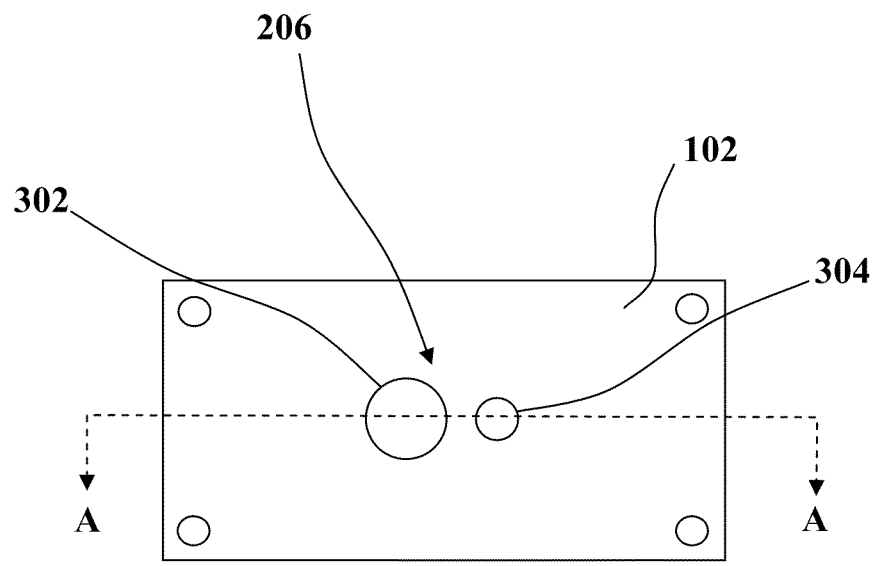
FIG. 3 representatively illustrates a base with multiple connectors.
Figure 4:
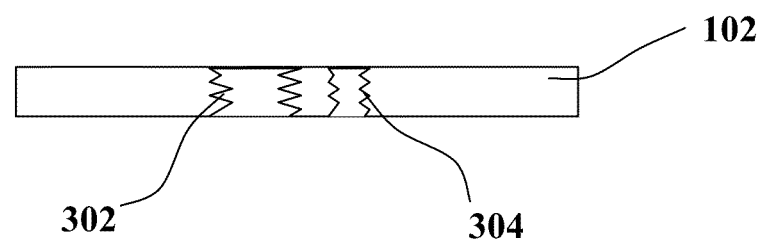
FIG. 4 representatively illustrates a cross-sectional view across line A-A of the base with the multiple connectors shown in FIG. 3.

Referring now to FIG. 2, the rigid base 102 may further comprise at least one connector 206 suitably adapted to attach the support device 100 to a stand such as a monopod or tripod. The connector 206 may comprise any suitable system for selective connection such as a hole, an insert, a peg, a bolt, or a spring. For example, in one embodiment, the connector 206 may comprise a threaded female receptacle set at least part way into a surface of the rigid base 102 and configured to receive a mating screw or bolt, such as that commonly used on monopod, bipod, and tripod devices. In another embodiment, the connector 206 may comprise a coil spring embedded into a circular hole. In yet another embodiment, the connector 206 may comprise a nut embedded in a surface of the rigid base 102 that is configured to receive a mating screw. Referring now to FIGS. 3 and 4, in a fourth embodiment, the connector 206 may comprise multiple receptacles 302, 304 of varying diameter, wherein each receptacle is suitably configured for connection to a different sized mating connector.

Figure 5:
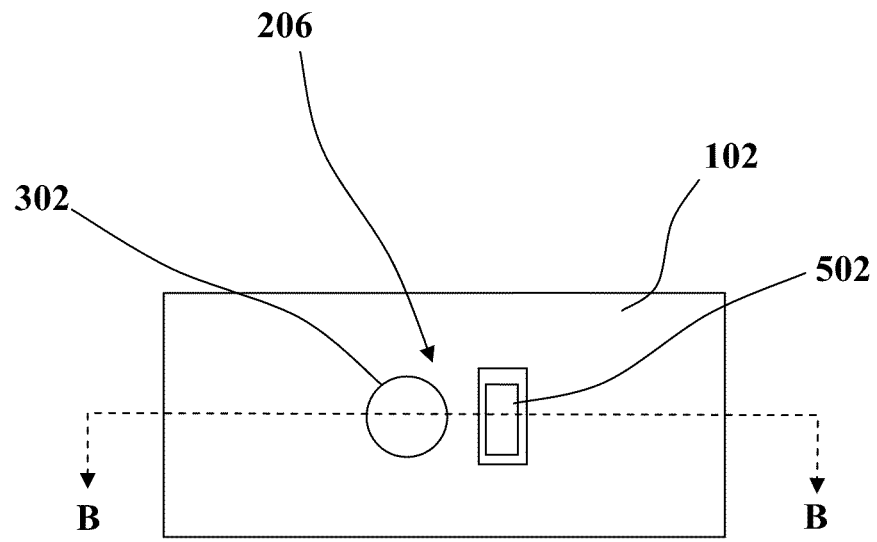
FIG. 5 representatively illustrates a base with an extendable connector.
Figure 6:
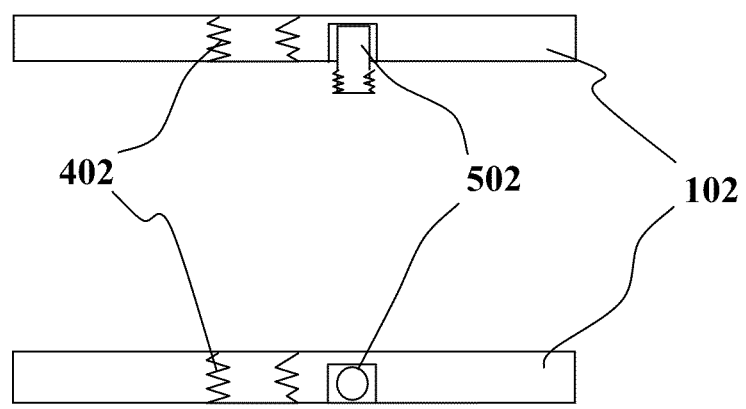
FIG. 6 representatively illustrates a cross-sectional view across line B-B of the base with the extendable connector as shown in FIG. 5.
Figure 7:
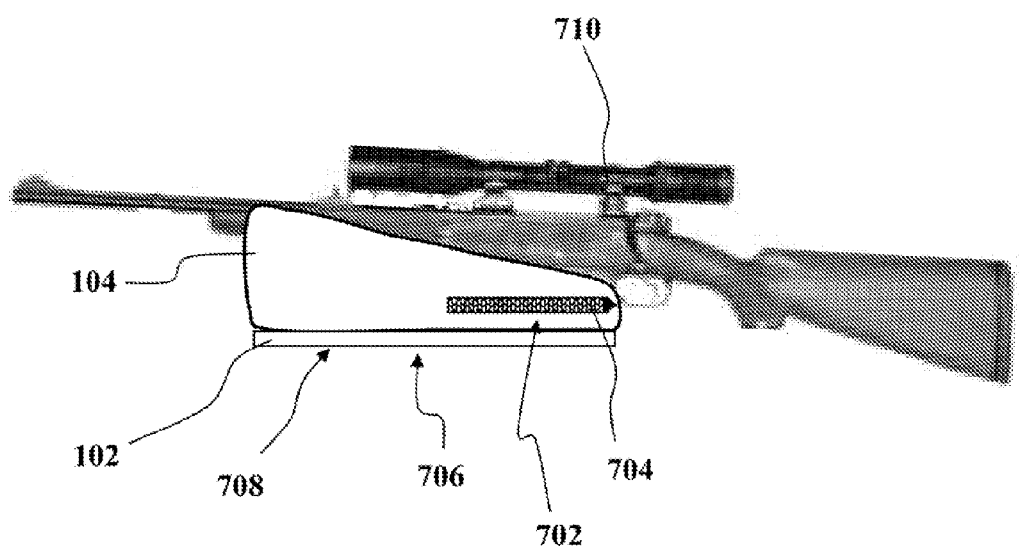
FIG. 7 representatively illustrates a support member with a resealable opening in accordance with an exemplary embodiment of the present invention.
Figure 8:
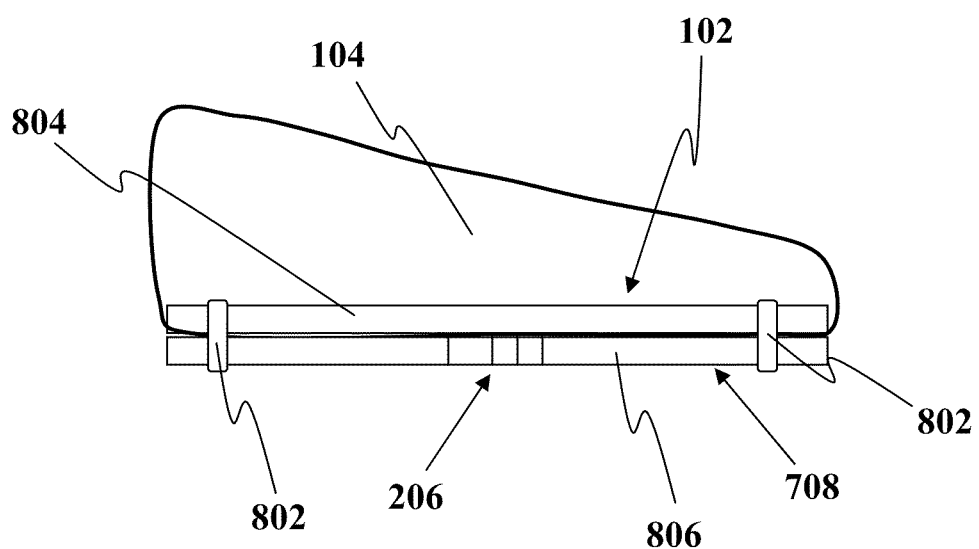
FIG. 8 representatively illustrates a cross-sectional view of a support member coupled between a two-piece rigid base.

The connector 206 may also comprise a protrusion instead of, or in addition to, a threaded receptacle. For example, the protrusion may comprise a screw or an adapter configured to fit at least part way into the connector 206 and have at least some portion protrude from the surface of the rigid base 102. The protrusion may then allow the support device 100 to be connected, for example, to a pivoting bipod. Referring now to FIGS. 5 and 6, in another embodiment, the protrusion 502 may also be housed substantially within the rigid base 102 and be configured to pivotally extend outward from the rigid base 102. In another embodiment, the protrusion may comprise an element suitably configured to fit within and connect to a swivel type connector associated with some common types of supporting devices.

The conformable support member 104 connects to the rigid base 102 and provides a surface suitably adapted to receive the placement of an object such as a camera body, a telescopic lens, and/or at least a portion of a rifle. The conformable support member 104 may comprise any suitable system for supporting an object such as a pouch, cushion, pillow, or bag. The conformable support member 104 may comprise any suitably non-rigid material such as suede, denim, leather, cotton, microfiber, canvass, or similar fabric. The conformable support member 104 material may also be suitably adapted to resist puncturing or tearing such as might occur from contact with shrubbery, thorns, branches, rocks, or exposed nails. For example, the conformable support member 104 may comprise a composite exterior surface material with an outer face suitably adapted to prevent scratching an object placed on the conformable support member 104 surface and an inner face material suitably adapted to resist an object puncturing all the way through the composite exterior surface material. The conformable support member 104 material may also be configured to withstand other environmental conditions such as water intrusion or be adapted to be anti-microbial, stain-resistant, quick drying, heat-resistant, and/or the like.

The conformable support member 104 may be configured substantially similar to the shape of the rigid base 102 or it may be oversized or undersized in relation to the rigid base 102. For example, referring to FIGS. 1, 2, 7, 8, and 9, the conformable support member 104 may be slightly larger dimensions than the rigid base 102. In another embodiment, the conformable support member 104 may be configured to wrap around a portion of a bottom side 708 of the rigid base 102. Alternatively, a portion of the conformable support member 104 may be configured to cover both a top side 706 and substantially all of the bottom side 708 of the rigid base 102 such that only the connector 206 is exposed to view.

The conformable support member 104 may further comprise a conforming surface suitably adapted to conform to the shape of a hand-held object 710 such as a rifle barrel or stock and/or cushion the object when placed on the conforming surface. The conformable support member 104 may also be configured in any suitable geometric design. For example, in one embodiment, the conformable support member 104 may be configured to account for the varying geometry of a rifle. Referring again to FIGS. 1 and 7, the conformable support member 104 may comprise a conforming cushion that generally slopes along an upper surface from a first end of the conformable support member 104 to a second end such that a barrel portion of the rifle may be rested on a portion of the cushion proximate to the first end and a stock portion of the rifle may be simultaneously rested on a second portion of the cushion proximate to the second end of the conformable support member 104 allowing the rifle as a whole to lie substantially parallel with the rigid base 102. In another embodiment, a portion of the conformable support member 104 may be configured with a slightly concave segment suitably adapted to receive the barrel of a rifle.

The conformable support member 104 may be connected or coupled to the rigid base 102 by any suitable method such with an adhesive or with mechanical fasteners such as rivets, screws, snaps, or bolts. For example, referring now to FIG. 8, in one embodiment, the conformable support member 104 may be secured between two pieces of the rigid base 102 coupled together by a plurality of rivets 802, wherein the two pieces comprise a top plate 804 and a bottom plate 806. A suitable adhesive sealant may also be used between the top plate 804 and the bottom plate 806 of the rigid base 102 to reduce localized stresses at the location of the rivets 802 and/or prevent ingress or egress of foreign materials between the top and bottom plates 804, 806 of the rigid base 102.

The conformable support member 104 may also comprise an inner volume or pocket suitably configured to be filled with a stabilizing and/or conforming filler material. For example, referring to FIGS. 7 and 8, the conformable support member 104 may comprise a bag or cushion configured to secure to the rigid base 102. The conformable support member 104 may further comprise an opening 702 providing access to the inner volume to allow the filler material to be added. The opening 702 may be configured with any suitable sealing device 704, such as a zipper, so as to prevent the filler material from exiting the inner volume.

The filler material may comprise any suitable material to provide at least a semi-conformable surface that is responsive to a placement of the object onto the conformable support member 104. The filler material may also provide a cushioning and/or stabilizing effect to the conformable support member 104. For example, materials such as rice, beans, viscoelastic polyurethane foam, expanded polystyrene beads, gel, recycled materials, and the like may be used for their ability to both support an applied weight and to shift within the inner volume when subjected to a weight bearing load allowing the conformable support member 104 to substantially conform to the shape of the object when it is placed on the conformable support member 104.

The filler material may also be disposed within a sealed pouch or bladder like device that is suitably adapted to fit through the opening 702 and be securely placed within the inner volume of the conformable support member 104. For example, in one embodiment, the sealed pouch may be filled with materials that are too small for personal handling such as ground-up recycled rubber, sawdust, ball bearings, and the like.

The opening 702 may further be configured with a sealing device 704 to allow the filler material to be removed, replaced, or refilled as needed. For example, during travel the inner volume may be emptied allowing the support device 100 to be packed more efficiently by reducing the overall size of the support device 100. The sealing device 704 may comprise any suitable system that allows access to an interior volume of the conformable support member 104 such as a zipper, a flap with a hook and loop fastener, or buttons.

The inner volume may also comprise any shape or design to allow the conformable support member 104 to more easily conform to a particular object. For example, referring again to FIG. 8, in one embodiment, a cross-sectional view of the inner volume may reveal a generally quadrilateral shape, wherein a cross-sectional area of the inner volume increases from the second end of the conformable support member 104 to the first end. In another embodiment, the inner volume may comprise a shape that is generally concave allowing the conformable support member 104 to more easily conform to a barrel or the stock of a cross-bow. In yet another embodiment, the inner volume may define a lip or raised edge along one end of the conformable support member 104 for receiving an object such as a telescopic lens.

Figure 9:
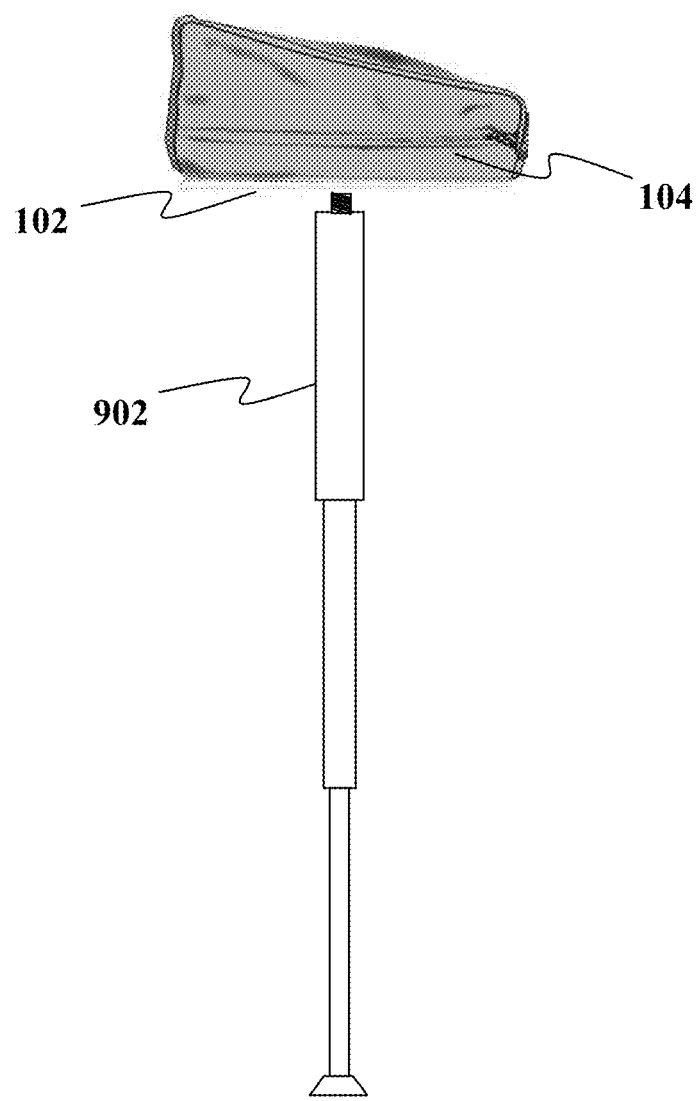
FIG. 9 illustrates a support device attached to a monopod.

In operation, a conformable support member 104 may be attached to a rigid base 102 to form a surface capable of supporting a hand-held object and/or at least partially isolate the hand-held object from vibrations applied to a surface of the rigid base 102. Referring now to FIGS. 2 and 9, the rigid base 102 may be further configured with a connector 206 suitably configured to allow the rigid base 102 to be connected to a supporting device 902 such as a monopod.

The conformable support member 104 may be configured to define an inner volume, pocket, or cavity suitably adapted to receive a filler material. The conformable support member 104 may further comprise an opening 702 providing access to the inner volume and a sealing device 704 which may allow the opening 702 to be selectively accessed by an operator. The opening 702 may allow a filler material to be added, removed, or adjusted as necessary and the sealing device 704 may prevent the filler material from leaking and/or falling out of the inner volume.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A supportive device for a hand-held object, comprising:
a rigid base comprising a first side and a second side;
a connector coupled to the first side of the rigid base; and
a support member coupled to the rigid base and extending outward from the second side of the rigid base, wherein the support member comprises:
a cushion having an inner volume;
a selectively accessible opening on a surface of the cushion wherein the selectively accessible opening is configured to provide access to the inner volume; and
an upper surface sloping from a first end of the support member to a second end relative to the second side of the rigid base, wherein:
the upper surface at the first end is separated from the rigid base by a greater distance than the upper surface at the second end; and the support member conforms to the hand-held object in response to a placement of the hand-held object on the upper surface.

2. A supportive device according to claim 1, further comprising a filler material disposed within the inner volume.

3. A supportive device according to claim 2, wherein the filler material is contained within a non-rigid pouch configured for placement within the inner volume.

4. A supportive device according to claim 1, wherein the connector comprises a threaded receptacle extending at least partially into the first side of the rigid base.

5. A support device for a firearm, comprising:
a rigid plate comprising a first side and a second side;
a connector positioned on the first side o1 the rigid plate; and
a conformable support member coupled to the rigid plate and extending outward from the second side of the rigid plate, wherein:
 a first end of the conformable support member extends outward a first distance from the second side of the rigid plate;
 a second end of the conformable support member extends outward a second distance from the second side of the rigid plate, wherein the second distance is less than that first distance;
 a top surface of the conformable support member slopes from the first end of the rigid plate to a second end of the rigid plate such that the top surface is angled relative to the rigid plate; and
 the cushioned support member is configured to receive and conform to at least a portion of the firearm, and wherein the cushioned support member comprises:
  an inner volume configured to receive a filler material; and
  a selectively accessible opening on a surface of the cushion, wherein the selectively accessible opening is configured to provide access to the inner volume.

6. A support device according to claim 5, wherein the filler material is disposed within a pouch configured to tit within the inner volume.

7. A support device according to claim 5, wherein the connector comprises a threaded receptacle extending at least partially into the first side of the rigid plate.

* * * * *